(12) United States Patent
Chew et al.

(10) Patent No.: US 12,496,222 B2
(45) Date of Patent: Dec. 16, 2025

(54) OCULAR DRAINAGE IMPLANT

(71) Applicants: NATIONAL UNIVERSITY HOSPITAL (SINGAPORE) PTE LTD, Singapore (SG); ADVANCED OPHTHALMIC INNOVATIONS PTE. LTD., Singapore (SG)

(72) Inventors: Paul Chew, Singapore (SG); Victor Koh, Singapore (SG); Cherry Chooi Ling Khoo, Singapore (SG)

(73) Assignees: National University Hospital (Singapore) Pte Ltd, Singapore (SG); Advanced Ophthalmic Innovations Pte. Ltd., Singapore (SG)

( * ) Notice: Subject to any disclaimer, the term of this patent is extended or adjusted under 35 U.S.C. 154(b) by 405 days.

(21) Appl. No.: 18/017,168

(22) PCT Filed: Jul. 22, 2020

(86) PCT No.: PCT/SG2020/050427
§ 371 (c)(1),
(2) Date: Jan. 20, 2023

(87) PCT Pub. No.: WO2022/019827
PCT Pub. Date: Jan. 27, 2022

(65) Prior Publication Data
US 2023/0255826 A1    Aug. 17, 2023

(51) Int. Cl.
*A61F 9/007*    (2006.01)
*A61M 27/00*    (2006.01)

(52) U.S. Cl.
CPC ....... *A61F 9/00781* (2013.01); *A61M 27/002* (2013.01)

(58) Field of Classification Search
CPC .................. A61F 9/00781; A61M 27/002
See application file for complete search history.

(56) References Cited

U.S. PATENT DOCUMENTS

| 5,346,464 A | 9/1994 | Camras |
| 6,142,969 A | 11/2000 | Nigam |

(Continued)

FOREIGN PATENT DOCUMENTS

| CA | 2995580 A1 | 2/2017 |
| CN | 106456364 A | 2/2017 |

(Continued)

OTHER PUBLICATIONS

International Search Report and Written Opinion in International Appln. No. PCT/SG2020/050427, mailed on Oct. 20, 2020, 9 pages.

(Continued)

*Primary Examiner* — Ariana Zimbouski
(74) *Attorney, Agent, or Firm* — Fish & Richardson P.C.

(57) ABSTRACT

Conventional ways of reducing pressure in the eye have inherent drawbacks and one such way to reduce these drawbacks is to provide an ocular drainage implant including a pliable plate which is so sized and shaped as to enable it to be positioned on a sclera surface or a sub-scleral space of an eye comprising a first exterior face and a second exterior face, with a plurality of apertures extending between the first and second faces, and a fluid drainage tube retaining structure; and a valve-less fluid drainage tube connected to the retaining structure and providing the implant with a longitudinal axis, the valve-less fluid drainage tube being adapted to drain fluid from an anterior chamber of the eye to the subconjunctival or the suprachoroidal space, wherein the retaining structure extends substantially across an entire dimension of the plate.

22 Claims, 14 Drawing Sheets

(56) References Cited

U.S. PATENT DOCUMENTS

| | | | |
|---|---|---|---|
| 7,811,268 B2* | 10/2010 | Maldon Ado Bas | ........................ A61F 9/00781 604/9 |
| 9,381,112 B1 | 7/2016 | Sponsell et al. | |
| 9,808,374 B2* | 11/2017 | Chew | .................. B29C 45/1671 |
| 2006/0189917 A1 | 8/2006 | Mayr et al. | |
| 2007/0078371 A1* | 4/2007 | Brown | ................ A61M 27/002 604/9 |
| 2015/0335488 A1 | 11/2015 | Bigler et al. | |
| 2017/0348148 A1* | 12/2017 | Bigler | ...................... F04B 43/04 |
| 2017/0348149 A1 | 12/2017 | Stergiopulos et al. | |
| 2018/0078416 A1* | 3/2018 | Christiansen | ....... A61F 9/00781 |

FOREIGN PATENT DOCUMENTS

| | | |
|---|---|---|
| CN | 106963543 A | 7/2017 |
| CN | 109890334 A | 6/2019 |
| WO | WO 2015/126332 | 8/2015 |
| WO | WO 2017/030902 | 2/2017 |
| WO | WO 2018060912 A1 | 4/2018 |
| WO | WO 2019/018807 | 1/2019 |

OTHER PUBLICATIONS

International Preliminary Report on Patentability in International Appln. No. PCT/SG2020/050427, mailed on Oct. 12, 2022, 5 pages.
Extended European Search Report in European Appln. No. 20946020.3, mailed on Nov. 2, 2023, 9 pages.

* cited by examiner

OCULAR DRAINAGE IMPLANT

CROSS-REFERENCE TO RELATED APPLICATIONS

This application is a U.S. National Phase application under 35 U.S.C. § 371 of International Patent Application No. PCT/SG2020/050427, filed on Jul. 22, 2020, the entire contents of which are hereby incorporated by reference.

TECHNICAL FIELD

The present invention relates to an ocular drainage implant, in particular to a suprachoroidal or a subconjunctival glaucoma drainage implant for reducing intraocular pressure in a controlled manner in eyes with glaucoma or ocular hypertension.

BACKGROUND ART

The reference to any prior art in this specification is not, and should not be taken as, an acknowledgement of any form of suggestion that such prior art forms part of the common general knowledge.

The aqueous humour which nourishes the eye is a watery fluid produced within the eye and is in a constant cycle of production and drainage. This equilibrium of production and drainage maintains the intraocular pressure in a healthy eye. An in-balance in this equilibrium leading to a build-up of pressure in the eye is known as ocular hypertension and this is a risk factor in the development of an optic neuropathy known as glaucoma. Glaucoma can damage the optic nerve, which can create blind spots in the visual field (small areas of an individual's vision where there is no image detection) and if left untreated, glaucoma can lead to irreversible vision loss.

There are several forms of treatment available to remedy glaucoma and these are usually approached in a step-wise fashion beginning with medication which is usually administered topically (through eye drops) or orally. These forms of medication work either to reduce production of aqueous humour, or they work to increase the rate of drainage.

The problems associated with such medication are usually two-fold, first, as they are usually steroid based, they tend to possess undesirable side-effects and second, patient compliance can be an issue as some either do not, or often forget to take their medication. Cost, of course, can also be a factor in some parts of the world.

When medication fails, surgery is the next option and typical procedures involve so-called filtration surgery, or an iridectomy. As these procedures each involve invasive surgery, they too possess inherent risks and may not always solve the problem in the long term.

This leads to the final method of treatment, which is the surgical implantation of an ocular drainage implant. Such implants, also known as 'aqueous shunts' are typically in the form of a pliable plate adapted to be attached to the sclera of the eye, with a drainage tube attached to the plate that resides in the anterior chamber of the eye.

Such implants however, also come with significant risk of complications and re-operation. Nevertheless, alternative to the conventional glaucoma implant surgeries is minimally invasive glaucoma surgeries (MIGS), which are a group of implants characterised by short duration of surgery, a less invasive approach, a good safety profile and a faster post-operative recovery. MIGS can be broadly classified by the mode of aqueous drainage, trabecular bypass, subconjunctival and suprachoroidal drainage. Of these, suprachoroidal drainage implants are the least explored and usually only allows one way of fixing them in place.

Accordingly, given the problems associated with the prior art, a need exists to provide an ocular drainage implant that tends to overcome the aforementioned problems.

Statements of the Invention

With the foregoing in view, the invention in one aspect resides broadly in an ocular drainage implant including:
  a pliable plate which is so sized and shaped as to enable it to be positioned on a sclera surface or a sub-scleral space of an eye, comprising:
    a) a first exterior face and a second exterior face, with a plurality of apertures each extending from the first exterior face to the second exterior face, and
    b) a fluid drainage tube retaining structure; and
  a valve-less fluid drainage tube connected to the retaining structure and providing the implant with a longitudinal axis, the valve-less fluid drainage tube being adapted to drain fluid from an anterior chamber of the eye to either a subconjunctival or a suprachoroidal space;
  wherein the retaining structure extends substantially across an entire dimension of the plate.

Such an arrangement is likely to reduce the possibility of flashes seen by a wearer of the implant caused by the drainage tube, as a substantial part of the drainage tube is located within the retaining structure and this part is unable to move and/or make contact with the eye. Such movement or contact being a potential cause of the sensation known as flashes or flashing that can be experienced by an individual. In addition, the design of the plate will enable it to be buried under a scleral flap which will improve and maintain its fixation.

Preferably, the fluid drainage tube retaining structure is integral with at least one of the first exterior face of the plate and the second exterior surface of the plate.

Preferably at least one exterior face of the plate is flat.

Preferably, the retaining structure comprises a linear or straight portion. Such an arrangement may be utilized to receive a straight portion of a fluid drainage tube.

Although the retaining structure could intersect any aspect of the plate, preferably, the retaining structure bisects the plate. In such form, preferably, the retaining structure bisects the length of the plate.

Preferably, equal numbers of apertures are formed/provided on either side of the retaining structure. In such form, only one aperture is provided on either side of the retaining structure.

The presence of apertures enables sutures to be applied to fix the implant in place and also allow for subsequent fibrous growth that will stabilise the plate and thus the implant.

Preferably each aperture is of the same size and shape.

Preferably, each aperture is curved, and in such form the curve forms a circle.

Preferably, the circumferential periphery of each aperture contacts the start of the fluid drainage tube retaining structure. This enables the dimensions of the plate to be reduced in size for the given size of aperture.

Preferably, the plate size may have an area of 16 mm$^2$ or smaller. Alternatively, the plate size may have an area larger than 16 mm$^2$ Preferably, the retaining structure is shaped and dimensioned such that in a cross-sectional view, the retaining structure contains at least one point of inflection. In such form, the retaining structure contains two points of inflection. Yet further in such form, the retaining structure does not comprise a continuous curve, but has a flat top. Such an embodiment leads to an implant which has a flat side and a non-flat (or raised) side. As the subconjunctival layer is thinner than the suprachoroidal layer, if the implant is intended to drain fluid from inside the eye to outside the conjunctiva space, it should be placed flat-side down on the eye and when it is intended to allow outflow of fluid from the anterior chamber, and into the suprachorioidal space, it should be placed non-flat-side down on the eye. This is because when sutured into position, the drainage tube of the former will be positioned shallower relative to the eye surface (which is preferred for the subconjunctival use) than the latter, which will be deeper (and thus better suited for suprachoroidal use). Accordingly, in such form, placement of the implant can be either in a first position or a second inverted (relative to the first) position on the eye, prior to suturing, depending on whether the implant is intended for subconjunctival or supra-choroidal use.

Preferably, the internal diameter of the drainage tube is in the range of 0.101-0.108 mm. In such a range, the flow rate of the aqueous humour does not follow the Hagan-Poiseuille equations regarding internal diameter flow resistance and accuracy of the range is within available manufacturing tolerances.

Although the plate could be an elliptical, obround, circular, or any other shapes that comprises rounded edges. Preferably, the shape of the plate is in the form of a truncated circle or 'squircle', i.e. formed from a series of alternating straight and curved portions. Each of the aforementioned alternating curved/straight shapes provides a degree of stability when fitted to the eye and reduces the degree of rubbing of the conjunctiva of the eyeball when blinking occurs, which would be more pronounced if the shape of the plate possessed any relatively 'sharp' points or edges. The circular or 'squircle' shape being particularly advantageous as they can both be fitted correctly, in one of two orientations.

Preferably, the fluid drainage tube is a straight relatively non-pliable tube.

Such an arrangement prevents kinking which may increase the risk of a blockage.

Preferably, the diameter of the drainage tube lies substantially within the same plane occupied by the first exterior face.

Preferably, the lowermost point of the circumferential periphery of the drainage tube lies substantially midway between the distance separating the first exterior face and the second exterior face.

Preferably, the implant is symmetrical about its longitudinal axis. This allows the implant to be placed either way up when being fixed into place.

Preferably, the implant is symmetrical about at least one axis orthogonal to its longitudinal axis. This arrangement has the advantage that it results in a symmetrical implant.

The drainage tube may be made more or less pliable by adjusting a distance separating the outer wall of the drainage tube from the inner wall of the drainage tube with respect to the diameter of the inner wall of the draining tube. For example, if a distance separating the outer wall of the drainage tube from the inter wall of the drainage tube is greater than the diameter of the inner wall of the drainage tube, this will result in a relatively less pliable drainage tube. Such an arrangement has the advantage of reducing the pliability of the drainage tube and enabling the correct flow rate of the aqueous humour to be obtained.

The edge length of respective first and second exterior faces when seen from above or below a respective face, (I,e, in two dimensions) can be a different size, leading to a bevel wall linking both edges, each end of the wall being connected to respective exterior face edges by a fillet or curve which is not necessarily of the same arc length. Each curve serves to minimise eye irritation, when the implant is in place.

Alternatively, if the edge lengths of respective first and second exterior faces are the same size, the thickness linking both edges together can be:
  i) a vertical wall connected to respective exterior face edges by a fillet or curve;
  ii) a continuous curve linking respective exterior face edges; or
  iii) a double bevel connected to respective exterior face edges by a fillet or curve, each slope of the bevel being connected together by a curve.

Preferably, the diameter of the outer wall of the drainage tube is less than the diameter of an aperture extending from the first exterior face to the second exterior face and in such form the diameter of the outer wall of the drainage tube is less than half the diameter of an aperture extending from the first exterior face to the second exterior face.

The connection between the valve-less fluid drainage tube and the retaining structure may be a sliding fit and/or connected by adhesive, (preferably silicone adhesive if the implant is made of silicone) or it may also be an integral connection.

Although the implant can be made of polyamide, preferably, it is made of silicone. It is contemplated that other biocompatible materials may be used.

BRIEF DESCRIPTION OF THE DRAWINGS

In order that the invention may be more readily understood and put into practical effect, reference will now be made to the accompanying sheets of drawings wherein.

DESCRIPTION OF EMBODIMENTS

In this specification the term integral is intended to cover both an item which is integrally assembled from a group of initially disparate integers into a single normally non-dismantlable structure, as well as an initially integrally formed single structure.

Figure 1:
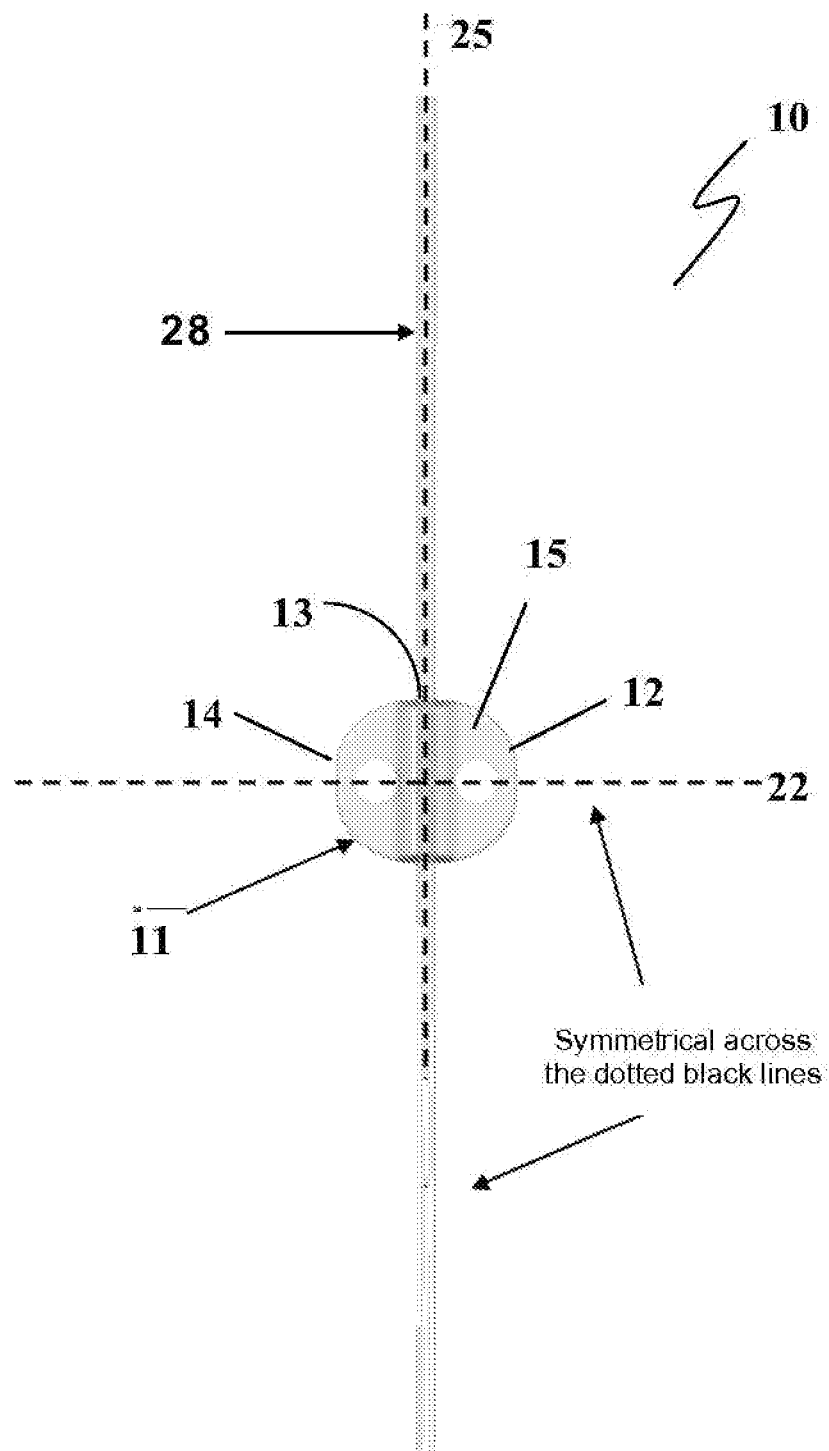
FIG. 1 shows a view of one face of one embodiment of an ocular drainage implant according to the invention, the vertical dotted line denoting the longitudinal axis of the implant and a first line of symmetry, the horizontal dotted line denoting another line of symmetry of the implant.
Figure 2:
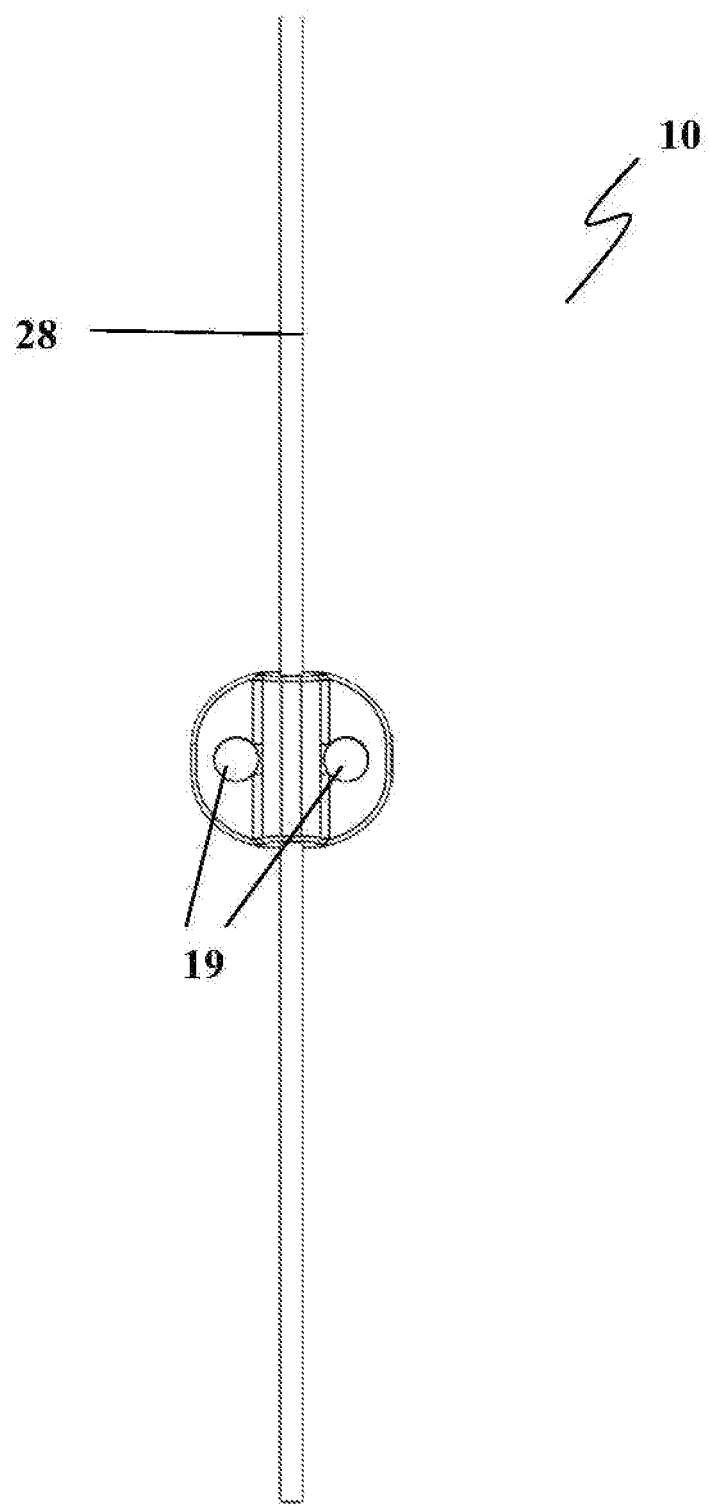
FIG. 2 is another view of the embodiment of the implant shown in FIG. 1 without the dotted lines.
Figure 3:
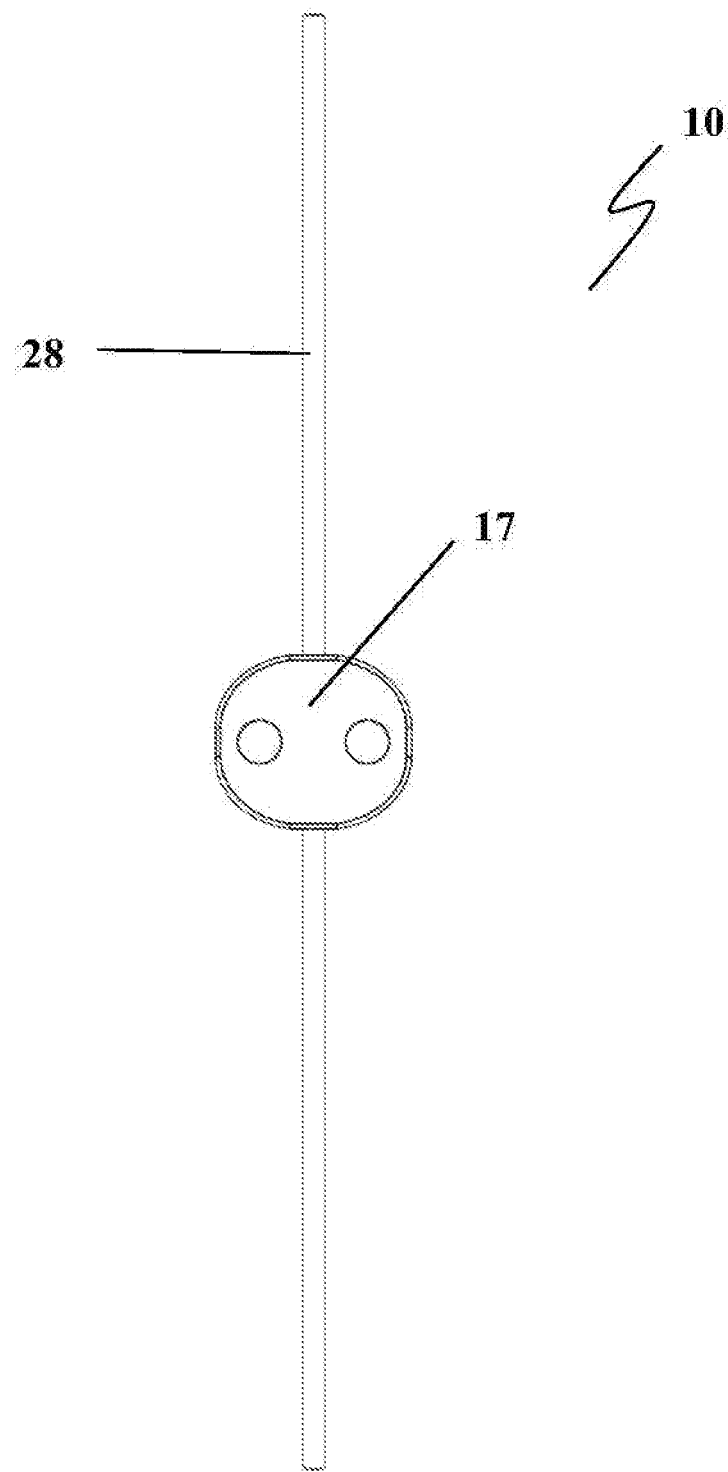
FIG. 3 is a view of the embodiment of the implant shown in FIGS. 1 and 2 showing the opposite face.
Figure 4:
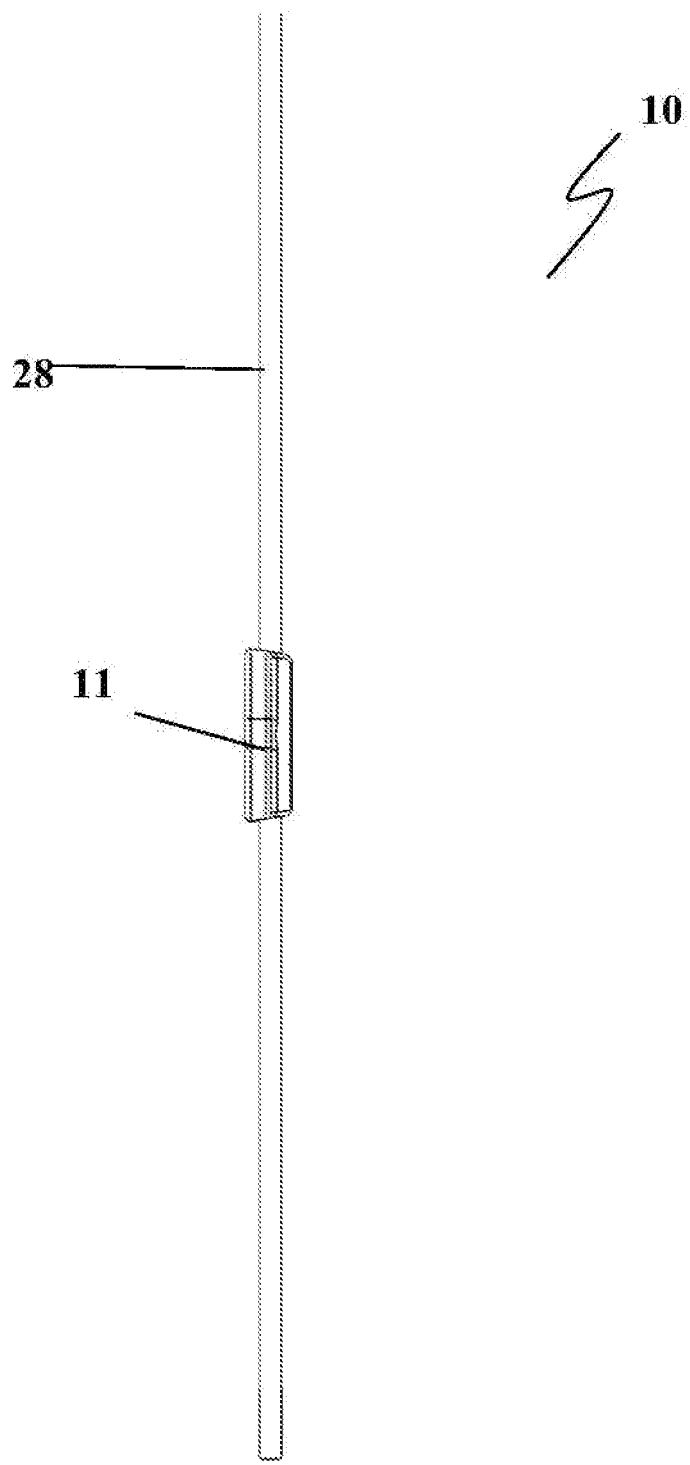
FIG. 4 is a side view of the embodiment of the implant shown in FIGS. 1-3.
Figure 5:
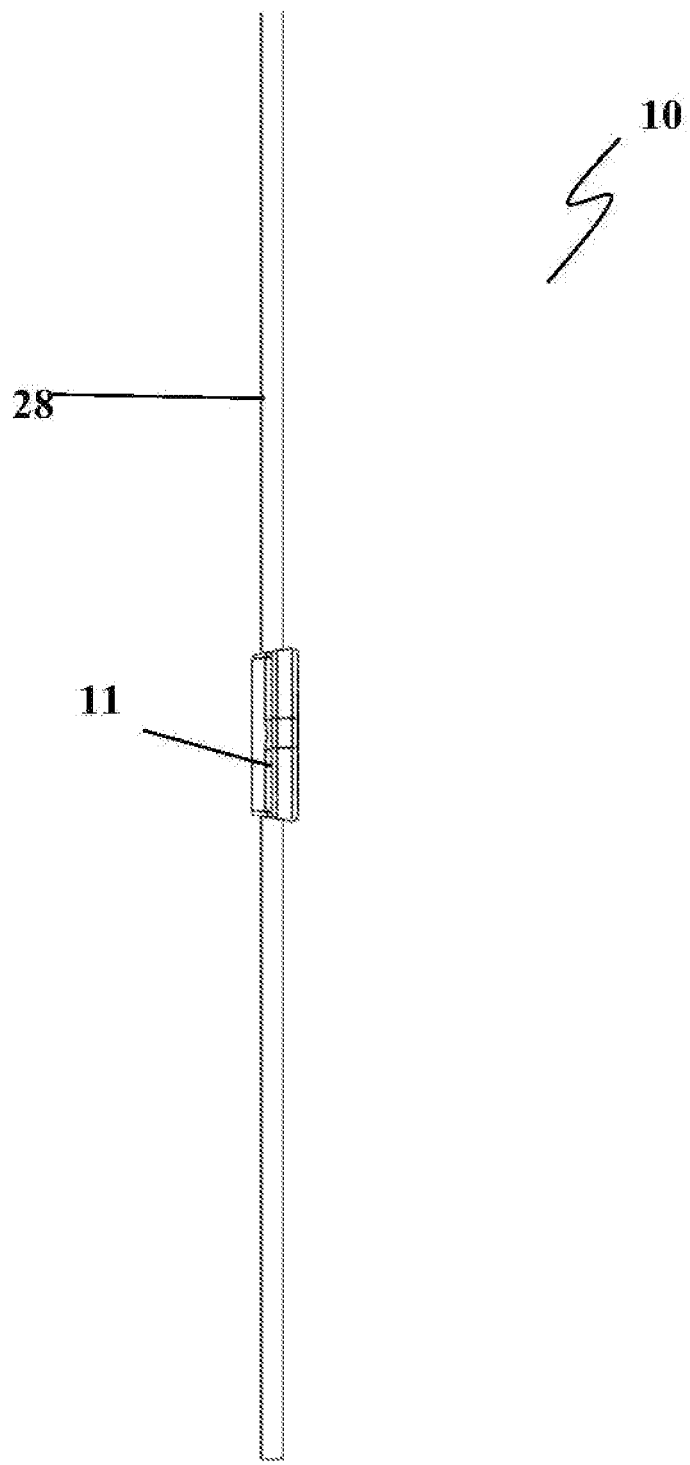
FIG. 5 is an opposite side view of the embodiment of the implant shown in FIG. 4.

FIGS. 1 and 2 show the same embodiment of an ocular drainage implant which is generally referenced 10. The implant 10 includes a smaller than 16 millimeters square ($mm^2$) pliable flat plate 11 formed from alternate curved 12 and straight portions 13, 14, the size and shape being such as to enable it to be positioned on the sclera surface or the sub-scleral space of an eye. The ocular drainage implant 10 may be partially or wholly formed of/from silicone. The plate 11 of defined thickness 20 up to the fluid drainage tube retaining structure 23 which will be described below—see FIG. 6 comprises a first exterior face 15, and FIG. 3 shows a second exterior face 17 which, when seen from below in FIG. 3, the edge length of the second exterior face 17 can clearly be seen.

A pair of identically sized and shaped spaced apart circular apertures 19 extends between the first and second faces 15, 17 of the plate 11 and the thickness of the silicone 20 separating these faces, defining the walls 21 of each aperture 19. The centre of each aperture 19 lies along a horizontal line of symmetry 22 of the implant 10. The plate 11 further comprises a linear fluid drainage tube retaining structure 23 integral with and forming part of the first exterior face 15 of the plate 11. The retaining structure 23 comprises two components, a face and a thickness, the latter separating the face of the retaining structure 23 from the second exterior face 17. The retaining structure 23 is a raised portion relative to the rest of the first exterior face 15 and extends from one end of the plate 11 to the other along the centre of the plate 11, thus bisecting it, the main axis of the retaining structure 23 being coaxial with a vertical line of symmetry 25 of the plate 11.

In cross section, moving from one side of the first exterior face 15 of the plate 11 to the other, one begins with the flat first exterior face 15 before meeting the retaining structure 23 which begins with a rising 'S type' shaped curve (thus including a point of inflection 26) followed by a flat top portion 27 and then a descending 'S-type' shaped curve (thus including a further point of inflection 26) before meeting the flat first exterior face 15 of the implant 10 once again.

Accordingly, the thickness separating the face of the retaining structure 23 from the second exterior face 17 is greater than the thickness 20 separating the regions of the first exterior face either side of the retaining structure 23 from the second exterior face 17. Each aperture 19 is located on either side of the retaining structure 23, the circumferential periphery of each aperture 19 contacting the rising start of each 'S-type' shaped curve. An elongate cylindrical fluid drainage tube 28 having an internal diameter 29 of between 0.101 and 0.108 mm adapted to drain fluid from an anterior chamber of the eye (not illustrated) is integral with the retaining structure 23 and the longitudinal axis of the tube 28 is coaxial with the vertical line of symmetry 25. The length of the tube 28 length either side of the plate 11 is the same and the lowermost point of the circumferential periphery of the drainage tube 28 lies substantially midway between the thickness 16 separating the first exterior face 15 and the second exterior face 17.

In addition the diameter of the tube 28 lies in the same plane occupied by the first exterior face 15 and the internal tube size and length gives a different resistance to fluid flow of aqueous humour to that of conventional tubes and hence provides the ideal flow rate for the intended purpose of the present invention. In other words, the flow rate of aqueous humour through the tube 28 of the present invention does not follow the normal flow rate of aqueous humour provided for under the principles of fluid dynamics, such as, but not limited to the normal Hagan-Poiseuille equations.

The mutually opposing straight portions 13 of the plate 11 may not be the same length as the mutually opposing straight portions 14 of the plate 11, the latter being longer in length than the former with portions 13 forming respective ends (and the widths) of the retaining structure 23. The lengths of the straight portions 13 are less than the diameter of the apertures 19.

Figure 6:
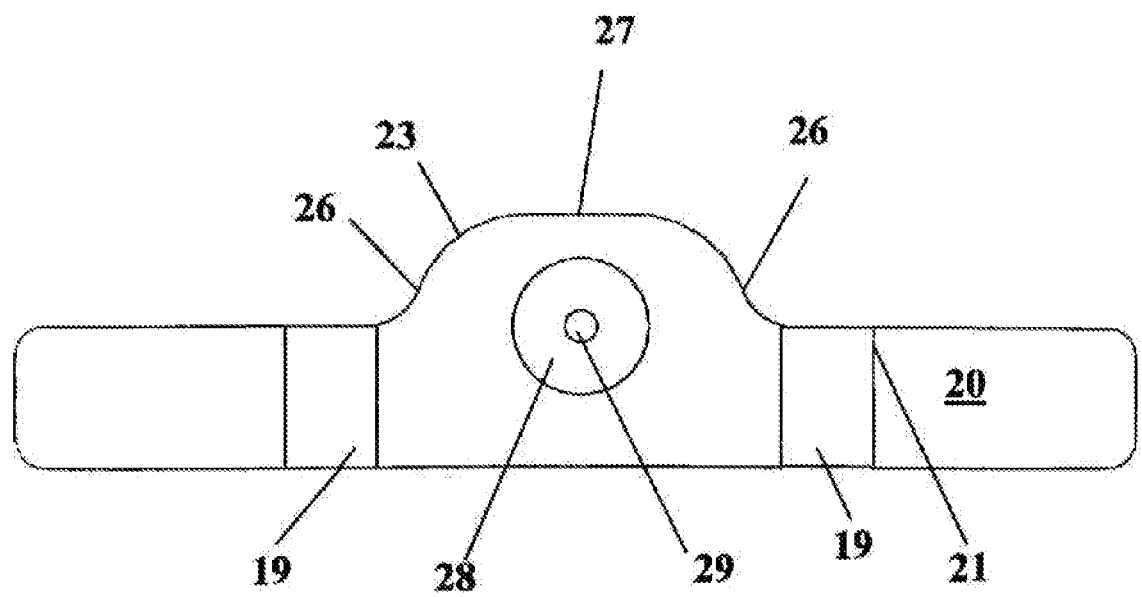
FIG. 6 is a cross-sectional view of the embodiment of the implant shown in FIGS. 1-5 showing the make-up of each part of the implant and showing vertical walls linking respective first and second exterior faces of the implant.
Figure 7:
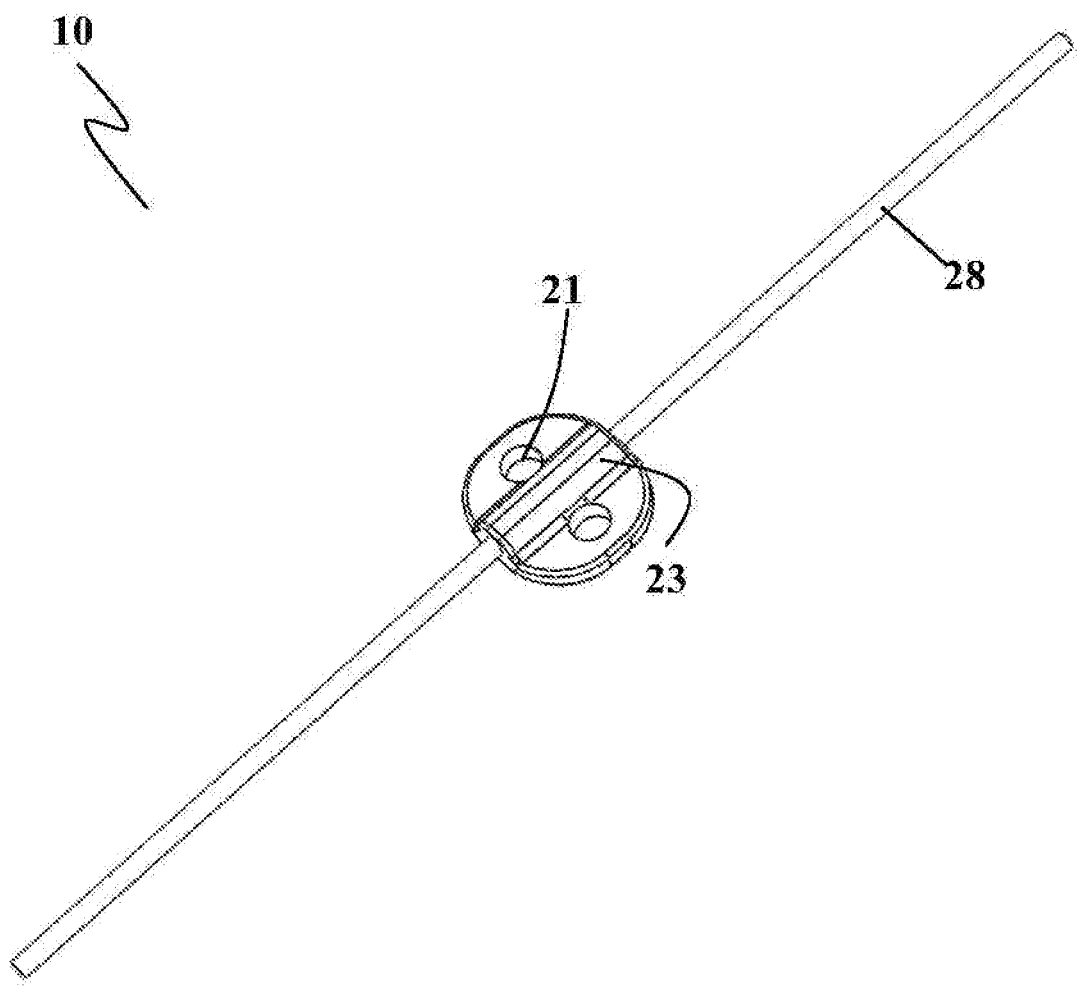
FIG. 7 is an isometric view of the embodiment of the implant shown in FIGS. 1-5.
Figure 8:
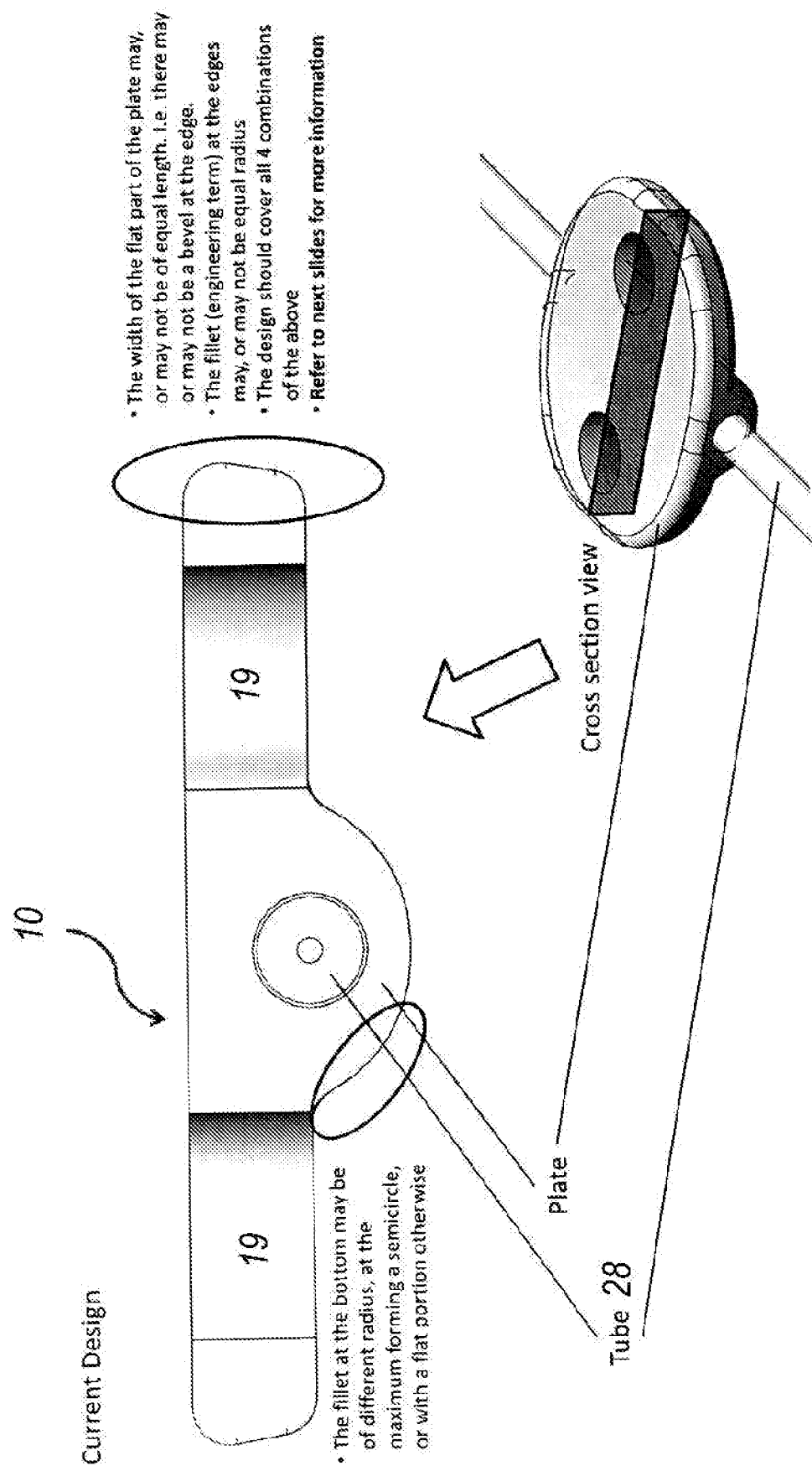
FIG. 8 is a cross-sectional view of another embodiment of the implant shown in FIGS. 1-5, with bevelled walls linking respective first and second exterior faces of the implant.

FIG. 8 shows a variant to the embodiment shown in FIG. 6. Instead of a vertical wall linking respective exterior face edges by a fillet as shown in FIG. 6, FIG. 8 is shows respective first and second exterior faces linked by a bevel via respective fillets of different arc lengths at either end of the bevel. This is because when seen from above or below a respective face 15,17, the edge length of each respective face 15, 17 is different. In addition, the retaininf structure 23 of this embodiment does not contain a flat top, but instead, is in the form of a convex curve.

In this embodiment, the edge length of the second exterior face 17 is longer than that of the first exterior face 15.

Figure 9:
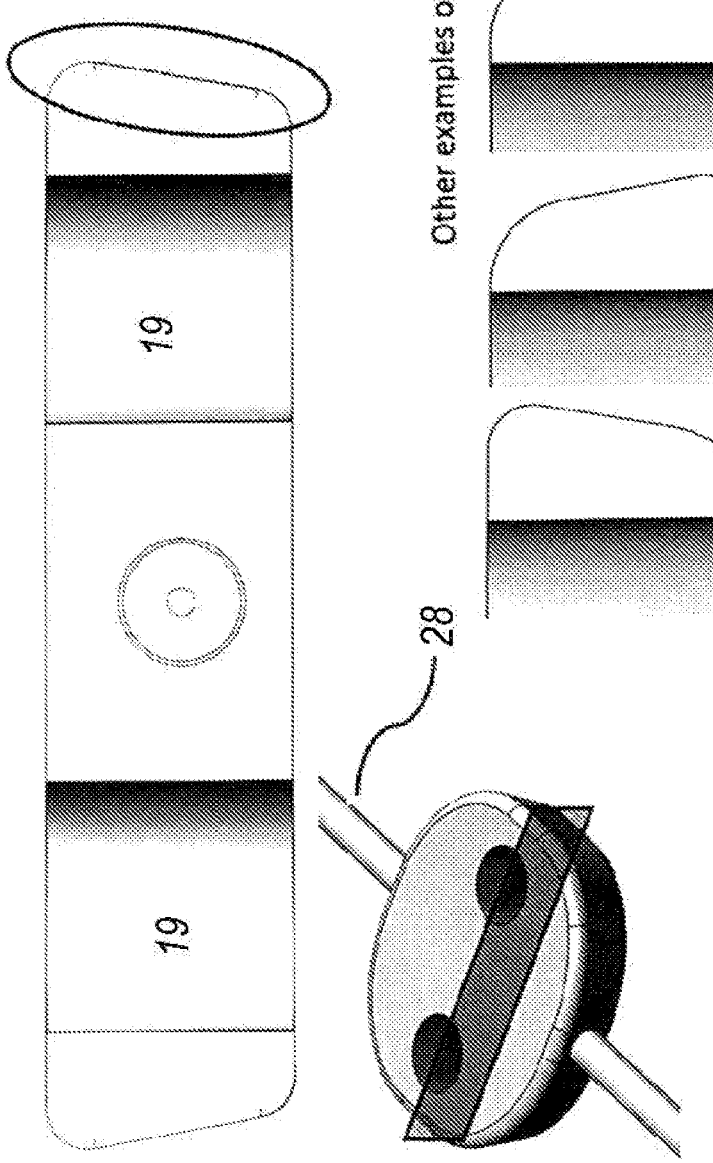
FIG. 9 is another embodiment of the implant and includes a range of various types of wall available to link respective first and second exterior faces of the implant available to this type of embodiment and other embodiments.

FIG. 9 shows another embodiment of the implant 10. In this embodiment, the linear fluid drainage tube retaining structure 23 is centrally located between respective first and second exterior faces 15 and 17 enabling both faces 15,17 to be planar flat faces. In this embodiment, the edge length of the second exterior face 17 is longer than the edge length of the first exterior face 15 leading to respective first and second exterior faces linked by a bevel similar to that shown in FIG. 8.

Figure 10:
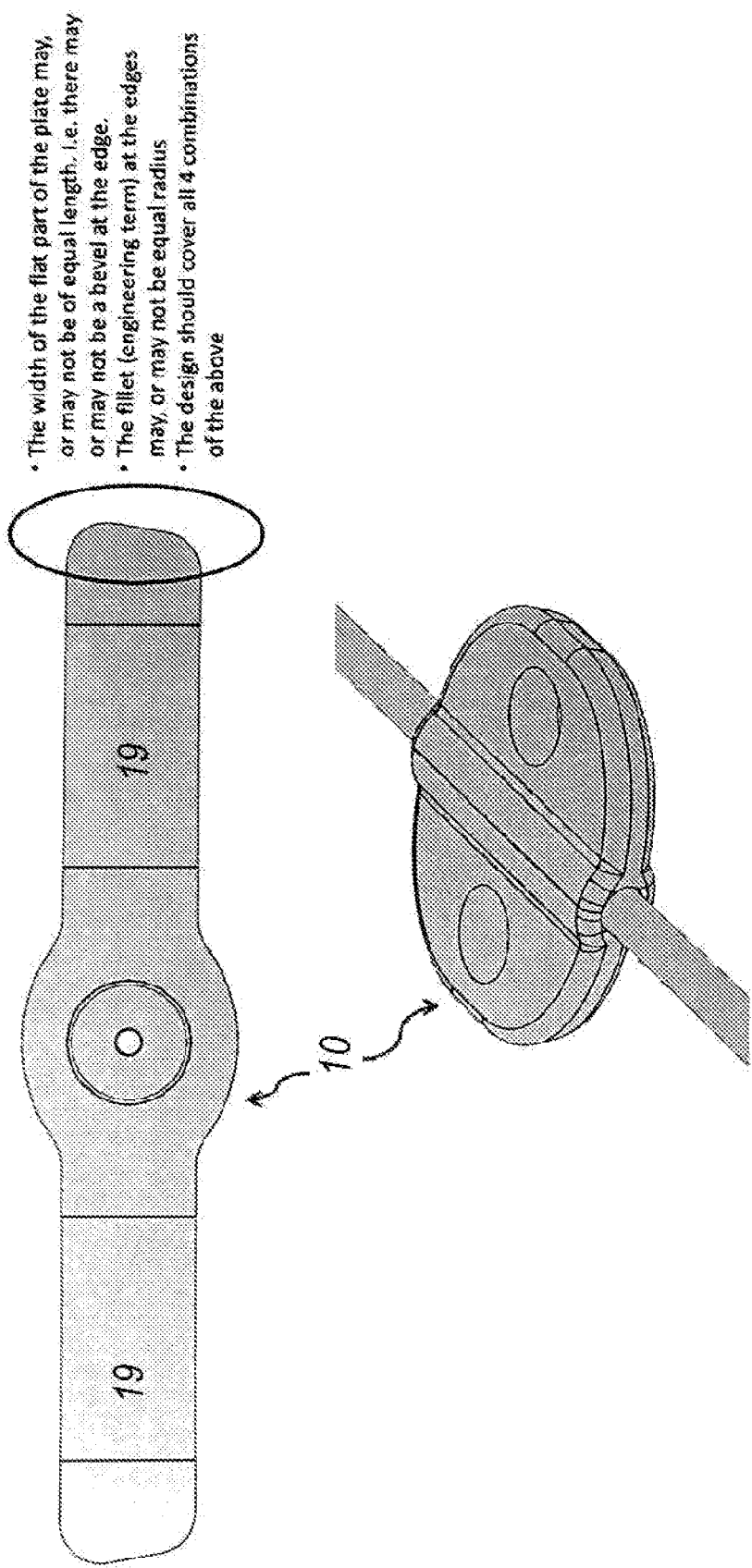
FIG. 10 is another embodiment of the implant.

FIG. 10 shows yet another embodiment of the implant 10. In this embodiment, the linear fluid drainage tube retaining structure 23 is again centrally located between respective first and second exterior faces 15 and 17, however, in this embodiment, both faces 15,17 are curved faces as the fluid drainage tube retaining structure 23 is integral with and forms part of both faces 15,17 and thus contains four points of inflection 26, two on each face 15,17. In this embodiment, the edge length of the second exterior face 17 is longer than that of the first exterior face 15, again leading to respective first and second exterior faces linked by a bevel similar to that shown in FIGS. 8 and 9.

Figure 11:
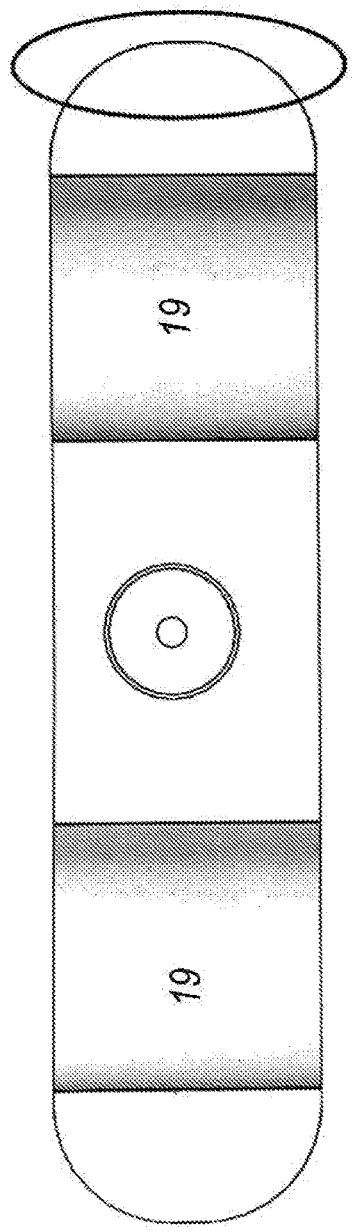
FIG. 11 is another embodiment of the implant and it also includes a range of fillet types that can be employed to link a vertical wall to respective first and second exterior faces of the implant in any type of embodiment.
Figure 11:
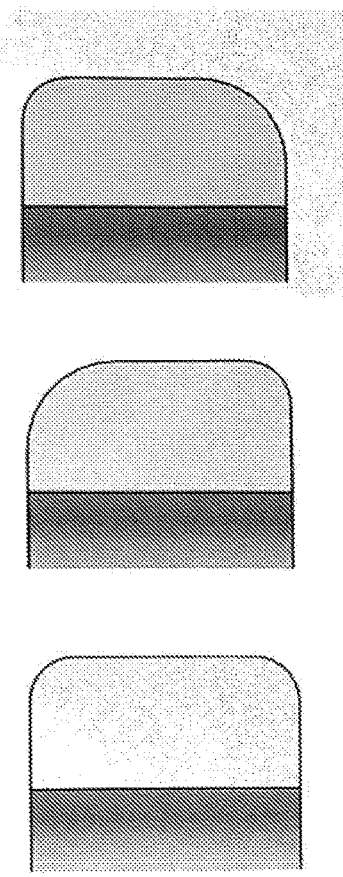
Figure 11:
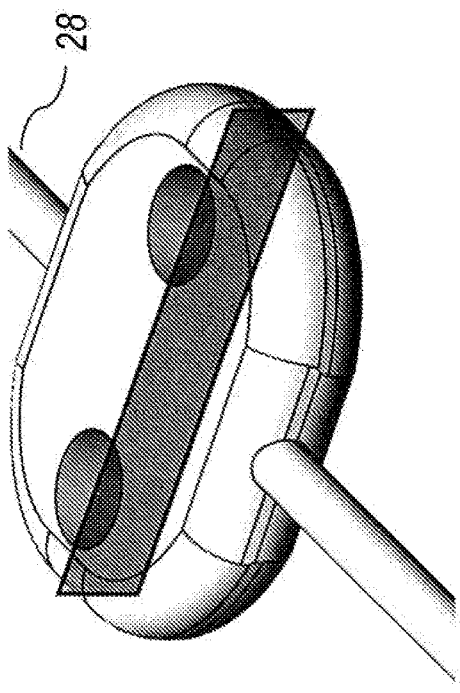

FIG. 11 shows a variant to the embodiment shown in FIG. 9. Instead of a bevel wall linking respective exterior face edges by a fillet as shown in FIG. 9, FIG. 11 shows respective first and second exterior faces linked by a continuous curve and in this embodiment, when seen from above or below a respective face 15,17, the edge length of each respective face 15, 17 is the same.

Figure 12:
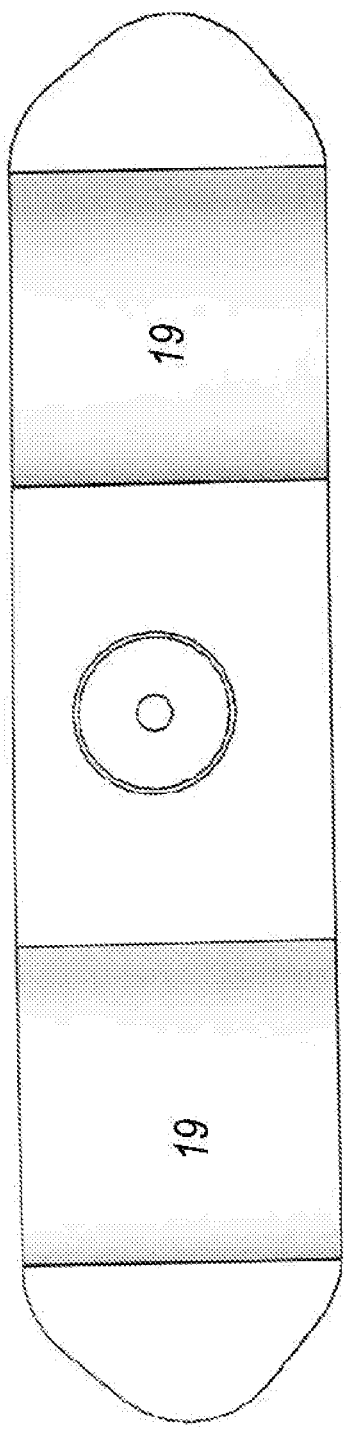
FIG. 12 is another embodiment of the implant which shows a double bevel linking respective first and second exterior faces of the implant and is symmetrical about the X, Y and Z axes.
Figure 12:
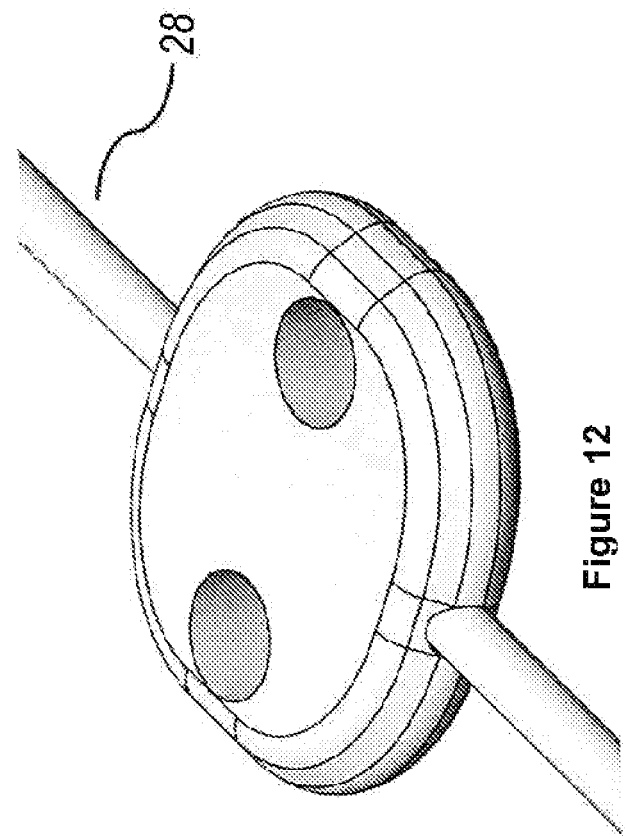

FIG. 12 shows a variant to the embodiment shown in FIGS. 9 and 11. Instead of a bevel or a continuous curved wall linking respective exterior face edges by a fillet as shown in FIGS. 9 and 11 respectively, FIG. 12 shows a double bevel linking respective first and second exterior faces 15,17 by a fillet, each sloping wall of the double bevel, also being connected at the midpoint between the first and second exterior faces by a curve. The embodiment shown in FIG. 12 is also an example of an embodiment which is symmetrical about the X, Y and Z axes.

Figure 13:
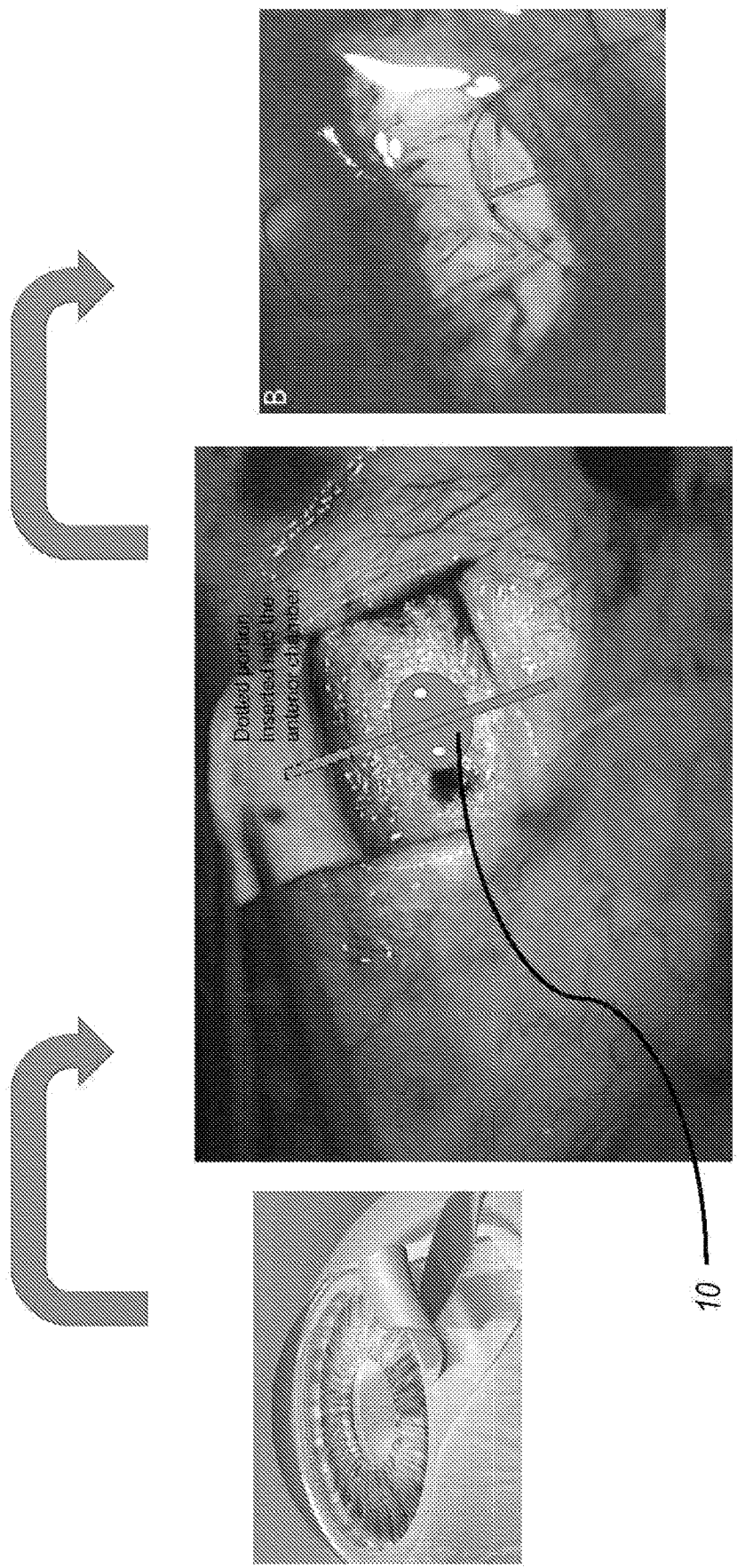
FIG. 13 shows a surgical method of fixing the implant when it is intended to be used to drain fluid from inside the eye to outside the conjunctiva space, the figure first showing an incision through the relatively thin subconjunctival layer, putting the implant in place in one orientation, and suturing the implant into place whilst suturing back the subconjunctiva.

FIG. 13 shows a surgical method of fixing the implant 10 on a sclera surface when it is intended to be used to drain fluid from inside the eye to outside the conjunctiva space, FIG. 13 first showing an incision through the relatively thin subconjunctival layer, putting the implant in place in one orientation, and suturing the implant into place using the apertures 19 whilst suturing back the subconjunctiva.

Figure 14:
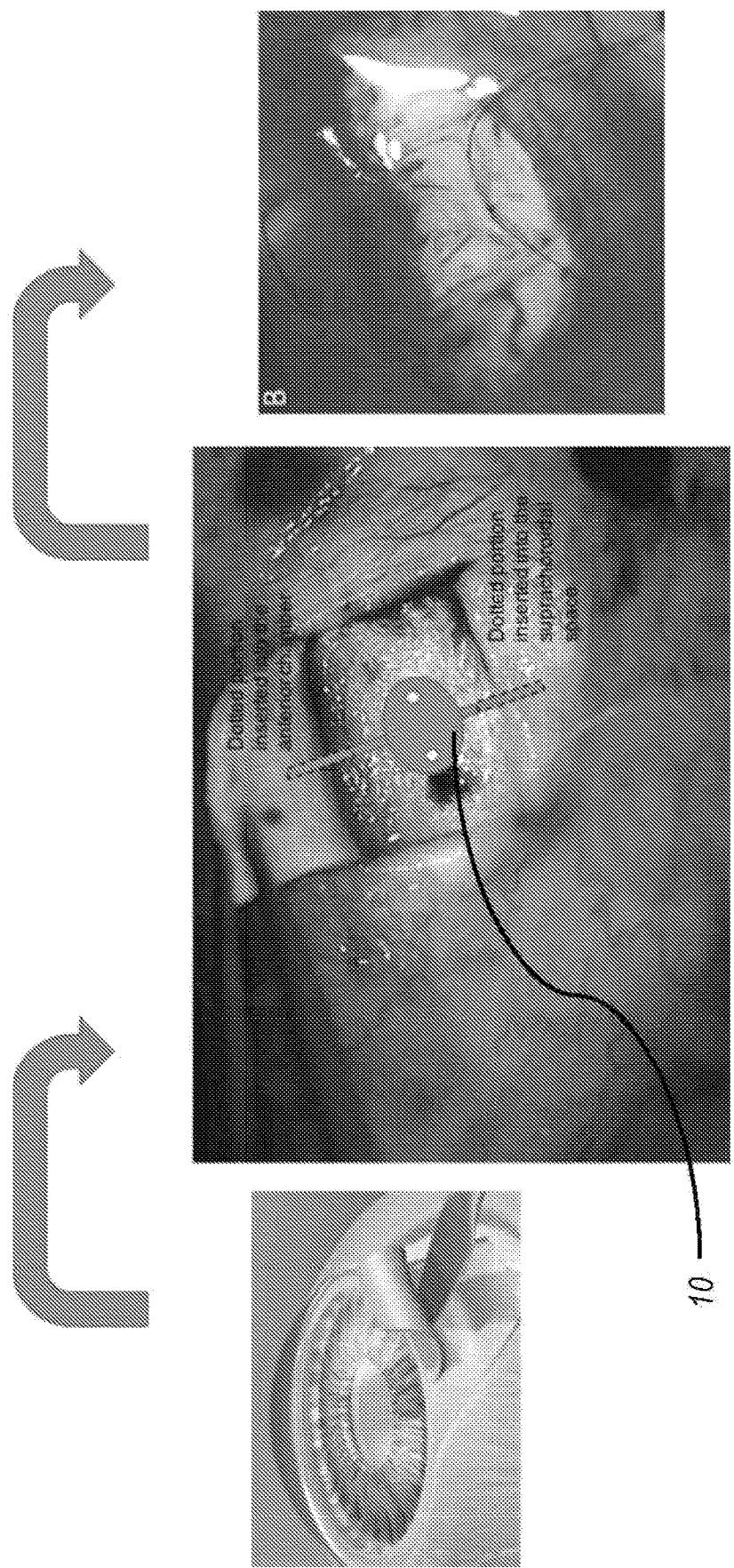
FIG. 14 shows a surgical method of fixing the implant when it is intended to allow outflow of fluid from the anterior chamber, and into the suprachorioidal space, the figure first showing an incision through the thicker (relative to the subconjunctival layer—see FIG. 13) suprachoroidal layer, putting the implant in place in an inverted orientation relative to the implant in FIG. 13, and suturing the implant into place whilst suturing back the cut tissue.

FIG. 14 shows an alternative surgical procedure, this time for fixing the implant 10 onto a sub-scleral space, when it is intended to allow outflow of fluid from the anterior chamber, and into the suprachorioidal space, FIG. 14 first showing an incision through the thicker (relative to the subconjunctival layer—see FIG. 13) suprachoroidal layer, putting the implant in place in an inverted orientation relative to the implant in FIG. 13, and suturing the implant 10 using the apertures 19 into place whilst suturing back the cut tissue.

The length of the fluid drainage tube 28 on both ends decide by the surgeon, will allow a surgeon to decide where he/she wants to drain to and how much flow resistance he wants to achieve in a specific eye, thus the final implant after surgery could be presented as a short front, long back; long front, short back; short front, short back; long front, long back, the terms referring to the eventual drainage tubing 28 lengths.

It should be further appreciated by the person skilled in the art that variations and combinations of features described above, not being alternatives or substitutes, may be combined to form yet further embodiments falling within the intended scope of the invention.

The invention claimed is:

1. An ocular drainage implant including:
an elongated cylindrical fluid drainage tube, wherein the drainage tube is valve-less and adapted to drain fluid from an anterior chamber of an eye to a subconjunctival or a supra-choroidal space; and
a pliable plate, wherein the plate size is 16 mm$^2$ or smaller, comprising:
   a) a first exterior face and a second lower exterior face;
   b) a fluid drainage tube retaining structure forming part of the first exterior face of the plate and including a thickness,
      wherein the thickness of the retaining structure separates the first exterior face from the second exterior face;
      wherein the retaining structure includes a raised top portion relative to the rest of the first exterior face and extends from one end of the plate to the other along the center of the plate to bisect the plate;
      wherein a main axis of the retaining structure is coaxial with a vertical line of symmetry of the plate;
      wherein a first thickness separating the top portion of the first exterior face from the second exterior face is greater than a second thickness separating regions of the first exterior face on either side of the top portion from the second exterior face; and
      wherein, along a cross section of the retaining structure, the first exterior face includes a first point of inflection, the top portion raised relative to regions of the first exterior face on either side of the top portion, and a second point of inflection; and
   c) a plurality of apertures, equal numbers of apertures contained on either side of the retaining structure, each aperture extending from the first exterior face to the second exterior face,
wherein a connection between the drainage tube and the retaining structure is a sliding fit of the drainage tube within the retaining structure, with lengths of the drainage tube located on either side of the plate after the drainage tube is received through the retaining structure; and
wherein the second exterior face of the plate is flat.

2. The implant as claimed in claim 1, wherein only one aperture is provided on either side of the retaining structure.

3. The implant as claimed in claim 1, wherein each aperture is the same size and shape.

4. The implant as claimed in claim 1, wherein each aperture is curved.

5. The implant as claimed in claim 4, wherein the curve forms a circle.

6. The implant as claimed in claim 1, wherein the retaining structure does not comprise a continuous curve.

7. The implant as claimed in claim 1, wherein the implant is made of silicone.

8. The implant as claimed in claim 1, wherein an internal diameter of the tube is in the range of 0.101-0.108 mm.

9. The implant as claimed in claim 1, wherein the tube is a straight tube that is less pliable than the plate.

10. The implant as claimed in claim 1, wherein a distance separating an outer wall of the drainage tube from an inner wall of the drainage tube is greater than a diameter of the inner wall of the drainage tube.

11. The implant as claimed in claim 1, wherein a diameter of an outer wall of the drainage tube is less than the diameter of any of the plurality of apertures.

12. A method of using an ocular drainage implant, the method comprising:
   a) providing the implant, the implant including:
      an elongated cylindrical fluid drainage tube, wherein the drainage tube is valve-less and adapted to drain fluid from an anterior chamber of an eye to a subconjunctival or a supra-choroidal space; and
      a pliable plate, wherein the plate size is 16 mm$^2$ or smaller, comprising:
         1) A first exterior face and a second lower exterior face;
         2) a fluid drainage tube retaining structure forming part of the first exterior face of the plate and including a thickness,
            wherein the thickness of the retaining structure separates the first exterior face from the second exterior face;
            wherein the retaining structure includes a raised top portion relative to the rest of the first exterior face and extends from one end of the plate to the other along a center of the plate to bisect the plate;

wherein a main axis of the retaining structure is coaxial with a vertical line of symmetry of the plate;

wherein a first thickness separating the top portion of the first exterior face from the second exterior face is greater than a second thickness separating regions of the first exterior face on either side of the top portion from the second exterior face; and wherein, along a cross section of the retaining structure, the first exterior face includes a first point of inflection, the top portion raised relative to the regions of the first exterior face on either side of the top portion, and a second point of inflection; and 3) a plurality of apertures, equal numbers of apertures contained on either side of the retaining structure, each aperture extending from the first exterior face to the second exterior face, wherein a connection between the drainage tube and the retaining structure is a sliding fit of the drainage tube within the retaining structure, with lengths of the drainage tube located on either side of the plate after the drainage tube is received through the retaining structure; and wherein the second exterior face of the plate is flat;

b) cutting portions of the lengths of the drainage tube located on either side of the plate in a field for positioning of the plate on the eye; and c) suturing the implant on the eye:

wherein, for subconjunctival use of the implant, placing the implant in a first position on the eye prior to suturing; and wherein, for supra-choroidal use of the implant, placing the implant in a second position on the eye, inverted relative to the first position, prior to suturing.

13. The method as claimed in claim 12, wherein only one aperture is provided on either side of the retaining structure.

14. The method as claimed in claim 12, wherein each aperture is the same size and shape.

15. The method as claimed in claim 12, wherein each aperture is curved.

16. The method as claimed in claim 15 wherein the curve forms a circle.

17. The method as claimed in claim 12, wherein the retaining structure does not comprise a continuous curve.

18. The method as claimed in claim 12, wherein the implant is made of silicone.

19. The method as claimed in claim 12, wherein an internal diameter of the tube is in the range of 0.101-0.108 mm.

20. The method as claimed in claim 12, wherein the tube is a straight tube that is less pliable than the plate.

21. The method as claimed in claim 12, wherein a distance separating the outer wall of the drainage tube from an inner wall of the drainage tube is greater than a diameter of the inner wall of the drainage tube.

22. The method as claimed in claim 12, wherein a diameter of an outer wall of the drainage tube is less than the diameter of any of the plurality of apertures.

* * * * *